US008888967B2

(12) United States Patent
Hemphill et al.

(10) Patent No.: US 8,888,967 B2
(45) Date of Patent: Nov. 18, 2014

(54) ELECTROCHEMICAL DRILLING SYSTEM AND PROCESS FOR IMPROVING ELECTRICAL POROSITY OF ETCHED ANODE FOIL

(71) Applicant: Pacesetter Inc., Sunnyvale, CA (US)

(72) Inventors: Jason Hemphill, Pickens, SC (US); Thomas F. Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 13/906,164

(22) Filed: May 30, 2013

(65) Prior Publication Data

US 2013/0264196 A1      Oct. 10, 2013

Related U.S. Application Data

(62) Division of application No. 11/972,792, filed on Jan. 11, 2008, now Pat. No. 8,535,507.

(51) Int. Cl.
| | |
|---|---|
| C25F 7/02 | (2006.01) |
| B23H 3/00 | (2006.01) |
| B23H 7/00 | (2006.01) |
| C25F 3/00 | (2006.01) |
| C25D 5/00 | (2006.01) |
| C25F 3/02 | (2006.01) |
| C25D 11/04 | (2006.01) |
| H01G 9/00 | (2006.01) |
| B31D 3/00 | (2006.01) |

(52) U.S. Cl.
CPC .... C25F 7/02 (2013.01); C25F 3/02 (2013.01)
USPC ........ 204/275.1; 204/206; 204/207; 204/208; 204/209; 204/210; 204/211; 205/640; 205/112; 205/324; 205/674; 205/686; 361/500

(58) Field of Classification Search
USPC .......................... 205/640–686; 204/206–211
See application file for complete search history.

(56) References Cited

U.S. PATENT DOCUMENTS

| | | | | |
|---|---|---|---|---|
| 6,736,956 | B1 * | 5/2004 | Hemphill et al. | 205/640 |
| 6,802,954 | B1 * | 10/2004 | Hemphill et al. | 205/640 |
| 7,147,827 | B1 * | 12/2006 | Balisky | 422/110 |
| 2004/0000484 | A1 * | 1/2004 | Sun et al. | 205/81 |
| 2008/0099343 | A1 * | 5/2008 | Brew et al. | 205/642 |

* cited by examiner

*Primary Examiner* — Dirk Bass
*Assistant Examiner* — Jennifer Wecker
(74) *Attorney, Agent, or Firm* — Theresha Raymer; Steven M. Mitchell

(57) ABSTRACT

A process for creating porous anode foil for use in an electrolytic capacitor of an implantable cardioverter defibrillator is provided. The process includes electrochemical drilling a plurality of etched metal foils in sequence one after the other in a bath containing electrochemical drilling (ECD) solution initially having a pH of less than 5. Alternatively, an etched foil sheet may be passed through the bath in a substantially continuous manner such that a portion of said etched foil sheet is in contact with the ECD solution is electrochemically drilled to generate pores. Electrochemical drilling is achieved when a current is passed to the foil or portion of the foil sheet in solution, ECD replenishment solution having a pH of less than about 5 is added from a feed reservoir to the bath at such a rate so as to maintain a pH in the ECD solution in the bath of less than about 5, and ECD solution in the bath is removed to a waste reservoir at the substantially the same rate as the addition of the ECD replenishment solution to the bath.

11 Claims, 7 Drawing Sheets

ELECTROCHEMICAL DRILLING SYSTEM AND PROCESS FOR IMPROVING ELECTRICAL POROSITY OF ETCHED ANODE FOIL

PRIORITY CLAIM

This application is a Divisional application of and claims priority and other benefits from U.S. patent application Ser. No. 11/972,792, filed Jan. 11, 2008, entitled "AN ELECTROCHEMICAL DRILLING SYSTEM AND PROCESS FOR IMPROVING ELECTRICAL POROSITY OF ETCHED ANODE FOIL" incorporated herein by reference in its entirety.

FIELD OF THE INVENTION

The present invention relates generally to implantable cardiac devices. More particularly, the invention relates to a system and process for creating a porous anode foil for use in an electrolytic capacitor of an implantable cardioverter defibrillator (ICD), for example, a multiple anode stack configuration electrolytic capacitor.

BACKGROUND ART

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used, A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an aluminum electrolytic capacitor is provided by the anodes, a clear strategy for increasing the energy density in the capacitor is to minimize the volume taken up by paper and cathode and maximize the number of anodes. A multiple anode stack configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. Energy storage density can be increased by using a multiple anode stack configuration element; however, the drawback is that the equivalent series resistance, ESR, of the capacitor increases as the conduction path from cathode to anode becomes increasingly tortuous. To charge and discharge the inner anodes (furthest from the cathode) charge must flow through the outer anodes. With typical anode foil, the path through an anode is quite tortuous and results in a high ESR for a multiple anode stack configuration. By keeping the ESR low, however, the charge efficiency and DSR (delivered to stored energy ratio) of the capacitor are maximized.

The conduction path from the cathode to the inner anodes may be made less tortuous by providing pores in the outer anode foil. In this manner, charge can flow directly through the outer anodes to the inner anodes. Thus, the use of porous anode foil can combat the increase in ESR resulting from the use of a multiple anode stack configuration, U.S. Pat. No. 6,802,954 to Hemphill et al., incorporated herein by reference in its entirety, describes an electrochemical drilling process for creating porous anode foil for use in multiple anode stack configuration electrolytic capacitors which produces a pore structure that is microscopic in pore diameter and spacing, allowing for increased energy density with a minimal increase in ESR of the capacitor. An etched foil is placed into an electrochemical drilling solution and a DC power supply is used to electrochemically etch the foil in the electrochemical drilling solution such that pores on the order of a few microns diameter are produced through the foil. The electrochemical drilling process creates large diameter "through" type tunnels, or pathways, in the foil that increase the electrical porosity of the foil, thereby improving charge efficiency and DSR. A widening process may be employed to widen tunnel diameter, maximizing surface area and reducing the taper of tunnels. A barrier layer oxide is formed on the anode foil, and the tunnel diameter should be large enough to leave a pore in the tunnels despite this oxide layer.

The electrochemical drilling process in accordance with U.S. Pat. No. 6,802,954, however, utilizes an electrochemical drilling solution with an initially neutral pH that becomes slightly basic with a pH of around about 9 to 11 shortly after starting processing of foils, causing aluminum dissolution in the solution to precipitate as aluminum hydroxide. This aluminum hydroxide solid should be filtered from solution if it is desired to process a plurality of foils; otherwise, the electrochemical drilling solution becomes less effective in creating "through" type tunnels that improve electrical porosity. Additionally, the aluminum hydroxide solid may build up on the process equipment, causing production downtime for routine cleaning (e.g., weekly) of the process equipment using a caustic solution. The electrochemical drilling solution should be dumped routinely (e.g., daily) and replaced with new solution free of solids.

What is needed, then, is a consistent and efficient method of creating a plurality of porous anode foil for use in capacitors that minimizes ESR while maintaining high capacitance.

BRIEF SUMMARY

An electrochemical drilling system and process for improving the electrical porosity of etched foils are provided. In one embodiment, a method for creating porous anode foils includes electrochemical drilling a plurality of etched metal foils in sequence one after the other, in a bath containing an electrochemical drilling (ECD) solution initially having a pH of less than 5. An ECD replenishment solution having a pH of less than about 5 is added to the bath at such a rate so as to maintain a pH in the ECD solution in the bath of less than about 5, and ECD solution is removed from the bath at substantially the same rate as the addition of the ECD replenishment solution to the bath.

In another method presented herein, an etched foil sheet is passed through the bath in a substantially continuous manner such that a portion of said etched foil sheet is in contact with the ECD solution. A current is caused to flow through the ECD solution in the bath, so that the portion of the etched foil sheet in contact with the ECU solution is electrochemically drilled to generate pores. ECD replenishment solution is added to the bath at such a rate so as to maintain a pH in the ECD solution in the bath of less than about 5. ECD solution is removed from the bath at substantially the same rate as the addition of the ECD replenishment solution to the bath.

A system for creating a porous anode foil includes an electrochemical bath containing an ECD solution initially having a pH of less than about 5; a charge source connected to the bath to cause an electrochemical reaction in the bath; a feed reservoir fluidly connected to the electrochemical bath, the feed reservoir containing an ECD replenishment solution having a pH of less than about 5; a waste reservoir fluidly connected to the electrochemical bath for receiving ECD solution removed from the bath; and adding means for adding the ECD replenishment solution to the bath from the feed reservoir so as to maintain a pH in the ECU solution in the bath of less than about 5. The bath may receive a plurality of etched metal foils in sequence one after the other or an etched foil sheet in a substantially continuous manner, with a portion of the etched foil sheet being in contact with the ECD solution.

The methods and system described herein provide the advantage of a continuous ECD process, in which circulation of ECD solution to/from the bath achieves a substantially steady state concentration of dissolved aluminum, which by maintenance of the solution pH, does not precipitate into aluminum hydroxide. As a result, production downtime is reduced, since batch renewal of the ECD solution is avoided and caustic cleaning of the process equipment is less frequent.

Further embodiments, features, and advantages of the present system and method, as well as the structure and operation of the various embodiments of the present system and method, are described in detail below with reference to the accompanying drawings.

BRIEF DESCRIPTION OF THE DRAWINGS/FIGURES

The accompanying drawings, which are incorporated herein and form part of the specification, illustrate the methods and systems presented herein for creating porous anode foil. Together with the detailed description, the drawings further serve to explain the principles of and to enable a person skilled in the relevant art(s) to make and use the methods and systems presented herein. In the drawings, like reference numbers indicate identical or functionally similar elements. Further, the drawing in which an element first appears is typically indicated by the leftmost digit(s) in the corresponding reference number.

FIG. 1 provides SEM photographs of a surface of a foil made with a conventional neutral pH electrochemical drilling solution ("Neutral ECD") and SEM photographs of a surface a foil made with a low pH electrochemical drilling solution ("Low pH ECD").

FIG. 2 provides an SEM photograph of a cross section of the "Neutral ECD" foil shown in FIG. 1 and an SEM photograph of a cross section the "Low pH ECD" foil shown in FIG. 1.

DETAILED DESCRIPTION

1. Overview

Figure 1:
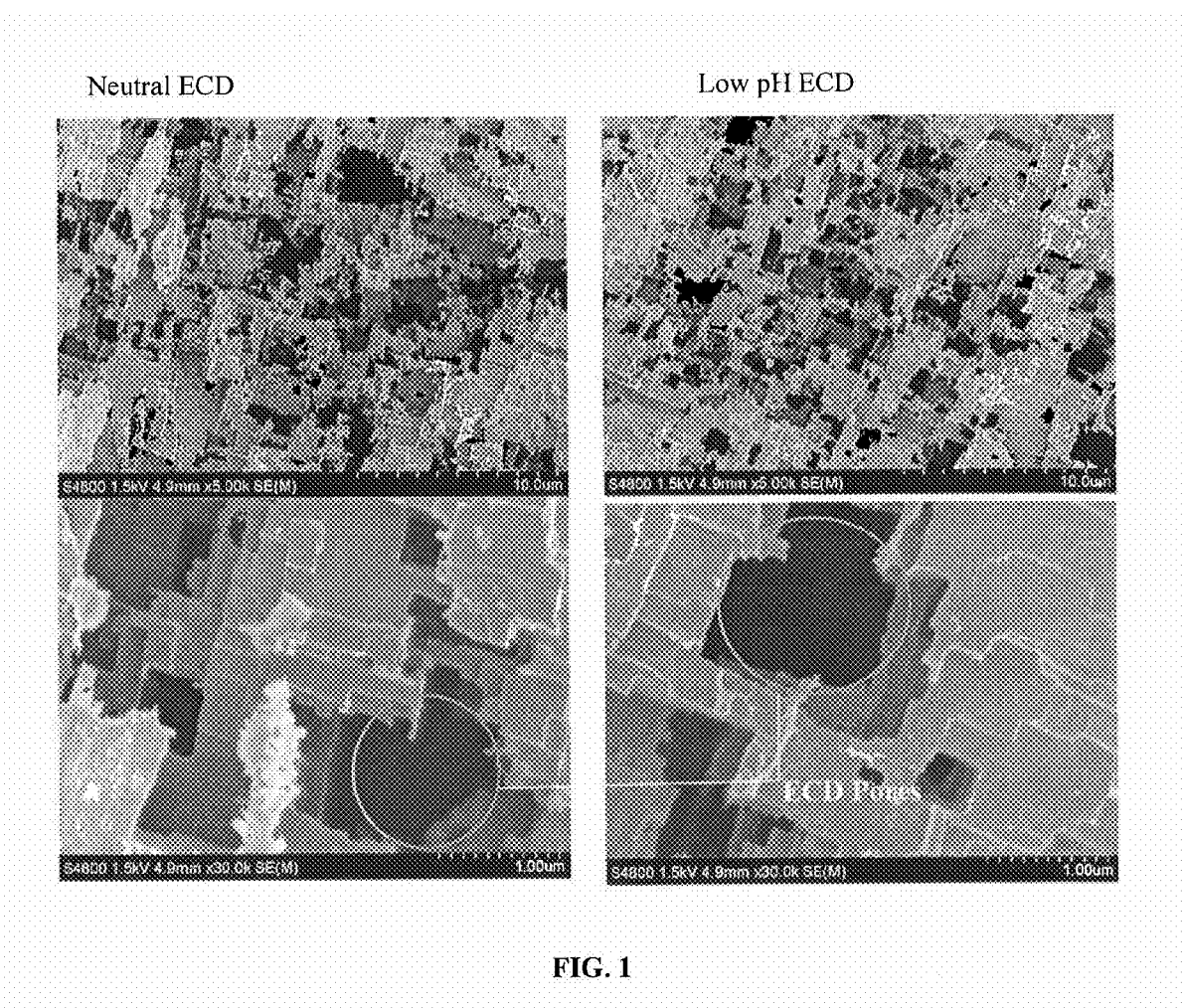

The following detailed description of methods and systems for creating porous anode foil refers to the accompanying drawings that illustrate exemplary embodiments consistent with these methods and systems. Other embodiments are possible, and modifications may be made to the embodiments within the spirit and scope of the methods and systems presented herein. Therefore, the following detailed description is not meant to limit the methods and systems described herein. Rather, the scope of these methods and systems is defined by the appended claims.

It would be apparent to one of skill in the art that the methods and systems for creating porous anode foil, as described below, may be implemented in many different embodiments without departing from the scope of the description below. Thus, the operation and behavior of the methods and systems will be described with the understanding that modifications and variations of the embodiments are possible, given the level of detail presented herein. It will be apparent to a person skilled in the relevant art that the methods and systems also be employed to produce porous anode foil for use in a variety of devices and applications in addition to use in an implantable cardioverter defibrillator (ICD).

The present invention is directed to a method of creating porous anode foil for use in electrolytic capacitors, particularly multiple anode stack configuration electrolytic capacitors, in order to reduce the equivalent series resistance (ESR) of such multiple anode stack configurations without sacrificing capacitance. According to a three step etch process, such as that described in U.S. Pat. No. 6,802,954, incorporated herein by reference, a metal foil is etched to produce an enlargement of surface area; then the etched foil is then placed into a electrochemical drilling solution and a DC power supply is used to electrochemically etch the etched foil in the electrochemical drilling solution to produce pores on the order of about 1 micron to about 1000 microns in diameter through the foil, increasing its porosity; and finally, the foil pores are widened and the foil is formed to the intended use voltage according to conventional widening and forming processes.

Initially, the anode metal foil is etched, according to a conventional etch process, as known to those skilled in the relevant art, to produce an enlargement of the surface area of the foil. The metal foil is preferably aluminum foil, because of its ability to produce a sufficient quality oxide layer, its conductive properties, and its wide commercial availability, However, other foils conventionally utilized in electrolytic capacitors could also be used, including tantalum, magnesium, titanium, niobium, zirconium and zinc. Preferably, a 100 to 125 micron thick, unetched, high purity (at least 99.98%) strip of aluminum foil with high cubicity, wherein at least 80% of the crystalline aluminum structure is oriented in a normal position (i.e., a (1,0,0) orientation) relative to the surface of the foil, is used. Such foils are well-known in the art and are readily available from commercial sources.

During the initial etching process, surface area of the foil is increased by electrochemically removing portions of the foil to create etch tunnels, as disclosed in U.S. Pat. Nos. 4,474,657, 4,518,471, 4,525,249 and 5,715,133. Since the capacitance of an electrolytic capacitor increases with the surface area of its electrodes, increasing the surface area of the anode foil results in increased capacitance per unit volume of the electrolytic capacitor. By electrolytically etching an anode foil, an enlargement of a surface area of the foil will occur. Electrolytic capacitors which are manufactured with such etched foils can obtain a given capacity with a smaller volume than an electrolytic capacitor which utilizes a foil with an unetched surface.

Typically, an aluminum foil may be etched in a high temperature etch electrolyte that is based on a halide and/or oxyhalide, such as a chloride and/or oxychloride, and contains an oxidizer such as peroxide, persulfate, cerium sulfate or sodium periodate, at a pH of about 0.0 to about 8.0, preferably a pH of about 1.0 to about 3.0. Other surface area enhancing etch solutions can be used to produce similar results. In one embodiment, the electrolyte etch solution consists of about 1.3% by weight NaCl and about 3.5% by weight $NaClO_4$. The electrolyte is heated to a temperature of about 80° C. to about 100° C., with a preferred temperature of about 85° C. The foil is placed in the etch electrolyte and etched at a current density of about 0.1 to about 0.3 amps/cm$^2$, preferably about 0.15 amps/cm$^2$, and at an etch charge of about 5 to about 50 Coulombs/cm$^2$ for a specific amount of time, preferably about 36 Coulombs/cm$^2$ for about 4 minutes. In the preferred embodiment, the foil is etched to produce an enlargement of surface area of at least 20 times.

In accordance with the present application, the etched foil is then placed into a bath containing an electrochemical drilling (ECD) solution at a temperature from about 40° C. to about 100° C., typically between about between about 91° C. and 98° C. The ECD solution of the present application has a pH of less than about 5, and is maintained at a sub-5 pH in accordance with the methods described in further detail below. If the foil is left in the solution for more than 5 seconds without applying a current to the foil, a hydration oxide layer will begin to form on the foil. The hydration oxide is not desirable, and should be removed during the widening process before the surface area of the tunnels can be maximized. As a consequence of hydration removal, the foil may have smaller tunnel diameters after widening, with reduced DSR and charge efficiency, and there may be significant variation in electrical porosity between foils. Therefore, it is desirable to reduce the rate of hydration formation to decrease such variation of the electrical porosity. One way to reduce the rate of hydration formation is to reduce the ECD solution temperature. Accordingly, in one embodiment, the ECD solution is maintained at a reduced temperature between about 80° C. and 95° C., preferably between about 80° C. and 90° C. Foils subject to the ECD process using an acidic ECD solution at a temperature of 85 and 90 degrees have also been found to have statistically the same foil capacitance as foils subject to a neutral ECD solution at a temperature of 95 degrees. Accordingly, an acidic ECD solution in accordance with the present application can achieve a desirable electrical porosity and effectively drill foils without the assistance of a higher solution temperature, and the allowance of a lower solution temperature reduces the rate of hydration formation and therefore decreases the variation of the electrical porosity.

In one embodiment, the ECD solution is highly acidic, with a pH of equal to or less than about 3, and is maintained at or below a pH of 3 in accordance with the methods described in further detail below. In one embodiment, the pH is maintained within the pH range of 1 to 3, and in another embodiment, the pH range is 0.5 to 3. In another embodiment, the ECD solution is maintained at a pH at or below about 2. For an ECD solution having a pH at or below about 3, the initial electrochemical drilling solution is made of about 1% to about 15% by weight sodium chloride, preferably about 5% by weight, 0.1% by weight of an acid, and about 10 to about 5000 PPM of a surface passivator, preferably about 1000 PPM. The preferred surface passivator is sodium nitrate, but can be any alkali metal salt of nitrate, phosphoric acid or the alkali metal salts of phosphate, and any of the soluble silicates, such as sodium silicate and potassium silicate, and the alkali metal salts of sulfate. The surface passivator helps to protect the foil surface and concentrate the current density from the power supply to smaller areas for tunnel formation. The concentrated current density creates more "through" type tunnels. The preferred acid is hydrochloric acid, but can also be other acids such as phosphoric acid or nitric acid, for example.

As described in further detail below, an ECD replenishment solution is fed to the ECD bath during foil processing so as to maintain the desired pH of the ECD solution in the bath. ECD solution is correspondingly bled from the bath as waste. As noted above, the etched foil is placed in the bath of ECD solution and current is applied to the etched foil so as to electrochemically drill the etched foil. For example, as apparent to one of skill in the relevant art(s), a charge source may be connected to the foil (acting as an anode) and to cathode plate(s) to complete an electronic circuit, During the ECD process, water is reduced at the cathode plates, causing increase in the pH of the ECD solution. Feeding ECD replenishment solution maintains the pH, and bleeding ECD solution as waste helps to remove aluminum in solution from dissolution of the foil. Consequently, during the ECD process, an aluminum concentration in the ECD solution achieves steady state, and this concentration can be optimized for electrical porosity creation, which in turn should reduce variation in charge efficiency of the capacitor. Specifically, aluminum dissolution may be used as a measure of the electrochemical drilling. In general, the aluminum concentration in the ECD solution has an upper limit past which the ECD process is not effectively improving the electrical porosity of the foil. Therefore, the aluminum concentration may be maintained below this upper limit by adjusting the replenishment solution feed flow rate, and corresponding bleed flow rate, to and from the ECD bath. Since aluminum hydroxide is typically least soluble from above a pH of about 5 to about a pH of about 9, a maintained acidic pH of the ECD solution of less than about 5 prevents little to no formation of aluminum hydroxide solid in the solution and no filtering of the solution is needed. Production downtime and costs should be reduced since caustic cleaning is less frequent, if needed at all. Further, without aluminum hydroxide solid formation, variation in electrical porosity of multiple foils, or along a continuous foil sheet, is reduced, and there is no need to routinely replace the solution in the bath with new ECD solution.

To maintain the pH of the ECD solution at or below 3, it is preferred that the ECD replenishment solution is substantially identical to the initial ECD solution. For example, further to the above example, the ECD replenishment solution should be made of 1000 ppm sodium nitrate, 5% sodium chloride, and 0.1% hydrochloric acid. It should be apparent to one of skill in the relevant art(s) that the pH of the initial ECD solution and ECD replenishment solution may be adjusted to achieve a desired sub-neutral, or "low", pH by adding more or less acid. For example, in one embodiment, 0.5% by weight hydrochloric acid is used in the initial ECD solution and the ECD replenishment solution. Moreover, in one embodiment, if the initial ECD solution in the bath has a pH below that desired for electrochemical drilling, then dummy foils may be run through the ECD solution to raise the pH of the ECD solution prior to processing of foils. Thereafter, the ECD replenishment solution, having a lower pH than the solution now in the bath, may be added to the bath with little fluctuation in the pH of the solution in the bath.

An appropriate amount of electrochemical drilling produces a microscopic pore diameter and spacing which reduces ESR significantly. A DC power supply is used to electrochemically drill the foil (or a portion of a continuous foil sheet) at a constant current density and for a time of about five seconds to about 15 minutes, preferably between 10 sec and 3 minutes in one embodiment, preferably about 45 sec in another embodiment, preferably about 1 min 45 sec (1:45) in another embodiment, preferably about 2 minutes in another embodiment, and at a temperature from about 40° C. to about 100° C., preferably between about 80° C. and 90° C. The applied current density should be from about 0.1 to about 1.0 amp/cm$^2$, preferably about 0.2 amps/cm$^2$. The etch charge is varied from about 1 Q/cm$^2$ to about 50 Q/cm$^2$, preferably 18 Q/cm$^2$, to produce the desired number and size of electrochemically drilled holes.

Figure 2:
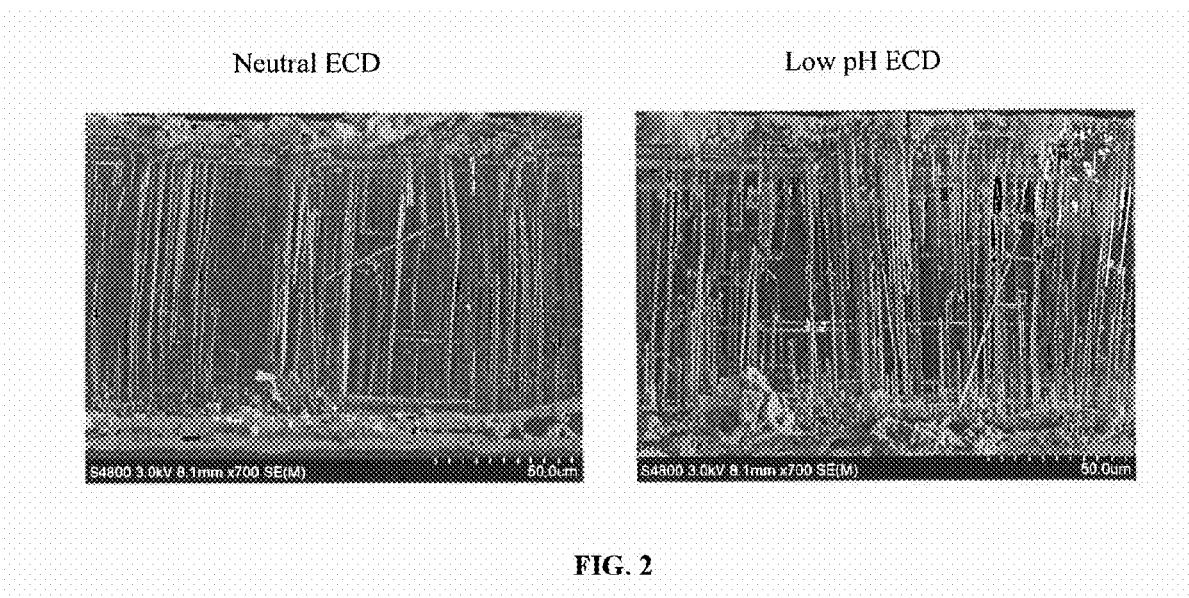

FIGS. 1 and 2 provide a comparison of an aluminum anode foil electrochemically drilled using a conventional neutral pH electrochemical drilling solution (i.e., solution excludes HCl; foil labeled as "Neutral ECD") and an anode foil electrochemically drilled using a low, acidic pH electrochemical drilling solution (i.e., solution includes HCl; foil labeled as "Low pH ECD"). FIG. 1 shows SEM photographs (providing two levels of magnification) of a surface of the "Neutral ECD" anode foil and a surface of the "Low pH ECD" anode foil, FIG. 2 shows SEM photographs of cross-sectional views of these respective foils, showing tunnels prior to any widening process. As shown in FIG. 1, the "Neutral ECD" foil has more surface erosion and aluminum chunk removal near areas of large tunnel formation. Areas of large tunnel formation provide high electrical porosity sites on the foil surface. The "Low pH ECD" foil also has high electrical porosity sites with high tunnel initiation, but having a more even surface, without significant surface erosion. The circled dark-colored portions in FIG. 1 indicate pores produced by the electrochemical drilling process. As shown in FIG. 2, the "Low pH ECD" foil has more tunnels spread out, though less tunnels go all the way through the foil and are generally not as long as the tunnels formed in the "Neutral ECD" foil. Notwithstanding, both foils have areas of long tunnels that would create a desirable electrical porosity pore. It is desired for the resulting pore size to be about 1 micron to about 1000 microns in diameter with pore to pore spacing of about 1 micron to about 100,000 microns, more preferably about 3 microns in diameter with spacing of about 15 microns between pore centers.

The etched foil can be masked so that only small areas of the etched foil are exposed to the electrochemical drilling solution. In one embodiment, the etched foil is held between two masks with a grid of openings which expose the masked foil. The masked foil is then placed into the electrochemical drill solution and a DC power supply is used, as discussed above, to further electrochemically etch the exposed areas of the foil. The electrochemical drill is allowed to continue until the appropriate pore size has been created.

The spatial arrangement of unmasked areas may be chosen from a number of irregular patterns, such as disclosed in U.S. Pat. No. 6,802,954. A pattern that allows the reduction of ESR, the maintenance of strength and the maintenance of capacitance is preferred for the mask. The pattern is configured in such a way that the enhanced area does not create large scale strength defects such as perforation holes, divots, chunk removal and the like. The exposed area can be as little as about 10% of the total foil area to as much as about 95% of the total foil area, and is preferably about 30% to about 70% of the total foil area. In one embodiment, the mask is held tight around the whole foil and the edges of the foil are blocked from the electrochemical drilling solution. Preferably, a thin mask having small tapered holes of less than 1 mm is used, to concentrate the applied current density and to allow bubbles formed during the electrochemical drilling process to escape more easily.

Next, the foil may be rinsed in an overflow deionized (DI) water bath for a time of about 1 to about 10 minutes, preferably about 1.5 minutes.

The foil pores are then widened in a chloride or nitrate containing electrolyte solution known to those skilled in the art, such as that disclosed in U.S. Pat. Nos. 3,779,877 and 4,525,249. Then the foil is dipped into a deionized water bath at a temperature of about 80° C. to about 100° C., preferably about 95° C., to form a hydrate layer on the foil surface.

Next, a barrier oxide layer can optionally be electrochemically formed onto one or both surfaces of the metal foil, sufficiently thick to support the intended use voltage, by placing the foil into a forming solution. Useful forming solutions include, but are not restricted to, a solution based on azelaic acid, sebacic acid, suberic acid, adipic acid, dodecanedioic acid, citric acid or other related organic acids and salts. Preferably, a citric acid solution is employed. This step is preferably conducted at a temperature of about 80° C. to about 100° C., preferably about 85° C., at a current density of about 1 mA/cm$^2$ to about 40 mA/cm$^2$, preferably about 16 mA/cm$^2$. A formation voltage of about 50 to about 800 Volts, preferably about 445 V, can be applied to the foil to form the barrier oxide layer. The barrier oxide layer provides a high resistance to current passing between the electrolyte and the metal foils, also referred to as the leakage current. A high leakage current can result in the poor performance and reliability of an electrolytic capacitor. In particular, a high leakage current results in greater amount of charge leaking out of the capacitor once it has been charged.

A heat treatment of 500° C.±20° C. may be applied to the foil following formation for about 1 to about 10 minutes, preferably about 4 minutes. The foil is then returned to the forming solution and allowed to soak with no applied potential for about 1 to about 10 minutes, preferably about 2 minutes. A second formation in the same electrolytic forming solution at high temperature is performed at a potential of about 435 Volts.

Next, the foils may be dipped in a suitable low concentration, oxide-dissolving acid solution, including but not restricted to, phosphoric acid, formic acid, acetic acid, citric acid, oxalic acid, and acids of the halides, preferably phosphoric acid, at an acid concentration of about 1% to about 10% by weight, preferably a concentration of about 2% by weight, at a temperature of about 60° C. to about 90° C., preferably about 70° C., for a time of about 1 to about 10 minutes, preferably about 4 minutes.

Finally, the foils are reformed at a voltage of about 435 Volts in a suitable forming solution, as discussed above, at a high temperature, preferably about 80° C. to about 100° C., more preferably about 85° C.

2. System and Methods for Sub-Neutral ECD

Figure 3:
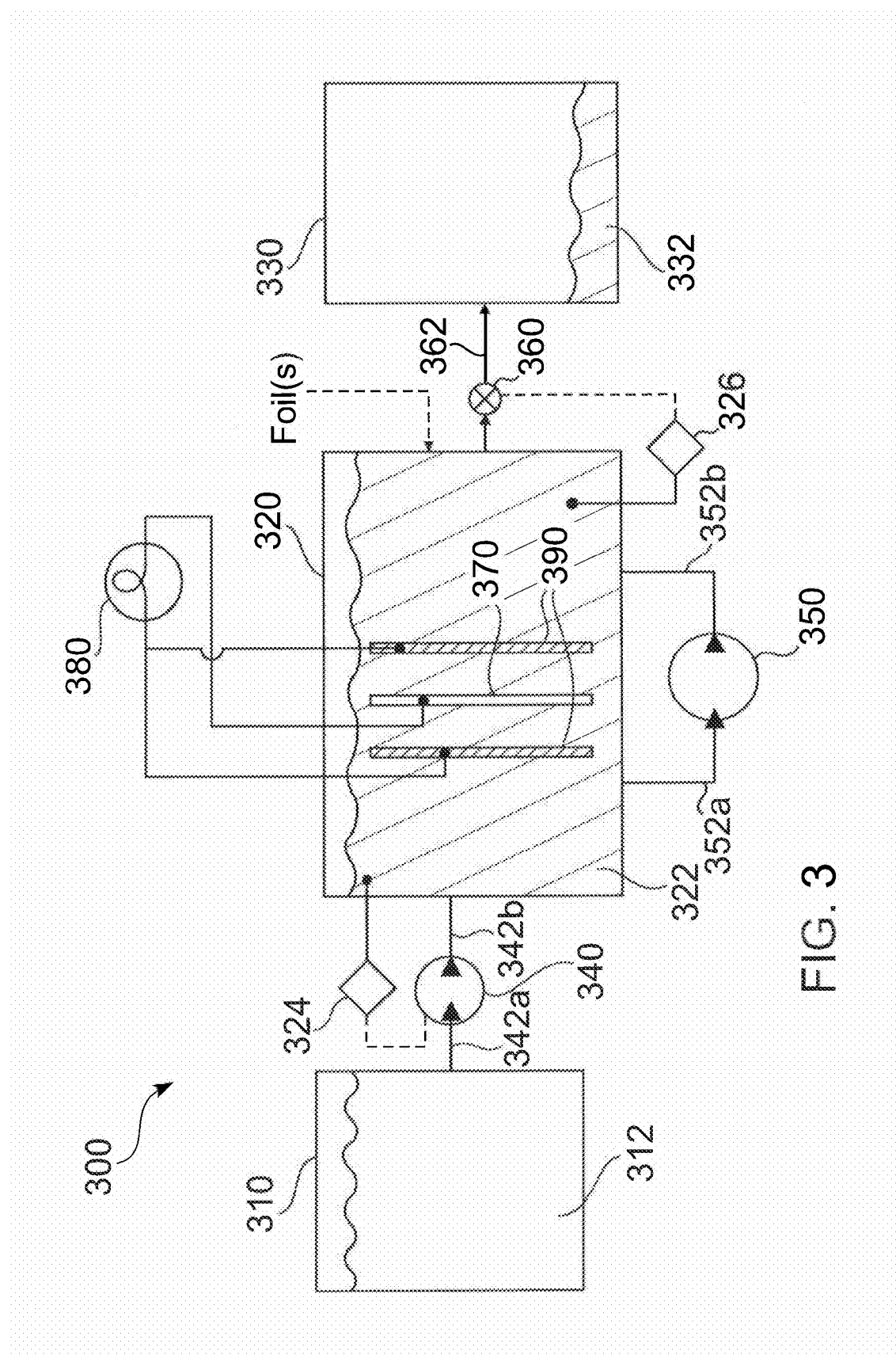
FIG. 3 is a schematic of an system for electrochemically drilling anode foil according to one embodiment of the present application.

FIG. 3 is a schematic of a system 300 for an ECD process according to one embodiment of the present invention. The system may be employed to electrochemically drill a plurality of etched foils in sequence one after the other or drill a continuous etched foil sheet in a substantially continuous manner.

System 300 includes an ECD bath 320, a feed reservoir 310, a waste reservoir 330, a metering pump 340, and a charge source 380 for passing a current through the bath, to cause an electrochemical reaction. In the embodiment shown, charge source 380 electrically connects anode foil 370 to cathode plates 390 placed adjacent opposing faces of foil 370. ECD solution 322 is contained in bath 320; ECD replenishment solution 312 is contained in feed reservoir 310; and discharged solution 332 bled from bath 320 is contained in waste reservoir 330. System 300 may further include a separate circulating pump 350 for churning the ECD solution in bath through inlet and outlet pipes 352a and 352b, respectively, to ensure mixing of ECD solution 322 in bath 320 with ECD replenishment solution 312 fed from reservoir 310. A pipe 342a fluidly connects feed reservoir 310 with metering pump 340, and a supply pipe 342b fluidly connects pump 340 with bath 320. A discharge pipe 362 fluidly connects bath 320 with waste reservoir 330. Discharge pipe 362 is provided with a solenoid valve 360 for controlling the amount of ECD solution 322 discharged from bath 320. A pH meter measuring the pH of ECD solution 322 in bath 320 is connected to solenoid valve 360, so that when the pH rises to a predetermined control limit, solenoid valve opens and ECD solution 322 is bled from bath 320. A solution level detector 324 senses if the solution bath 320 is below a predetermined control limit. Output from level detector 324 may be used to control pump 340, whereby when the solution level is below the predetermined control limit, pump 340 begins to feed replenishment solution 312 from feed reservoir 310. Bleed flow rates (through pipe 362) and feed flow rates (through pump 340) may be used to set control limits on the time periods pump 340 is operated and/or solenoid valve 360 is opened, thereby controlling the volume of solution fed or bled to/from bath 320.

In one embodiment, the initial ECD solution 322 in bath 320 and ECD replenishment solution 312 have a sub-neutral pH, with the respective pH of the solutions each being less than about 5. In another embodiment, the pH initial ECD solution 322 in bath 320 and ECD replenishment solution 312 are each less than or equal to 3, each being made of about 0.1% by weight of an acid, preferably hydrochloric acid. An exemplary feed flow rates to maintain the pH of ECD solution 322 in bath 320 is about 250 g/min per 50 liters of ECD solution in the bath.

It should be apparent that other embodiments of arrangements and control methods for system 300 than that depicted in FIG. 3 may be constructed, without departing from the spirit and scope of the ECD system and process described herein. For example, pH meter 326 may be connected to pump 340 so as to activate pump 340 when the pH of solution 322 in bath 320 reaches a predetermined pH, and level detector 326 may measure when solution 322 is above a predetermined level so as to open solenoid valve 360. Further, instead of solenoid valve 360, pipe 362 may be joined to an overflow port on bath 320, whereby solution 322 is discharged from bath 320 when it reaches above a predetermined level (due to feed of replenishment solution 312).

Bath 320 may be rectangular tank with an open top, or otherwise having opening(s) on one or more of its walls for entry and/or exit of the etched foils, Bath 320 may be configured to receive a plurality of etched foil sequentially. Further, bath may receive a set of one or more etched foils at one time, followed by additional sets of one or more foils processed in sequence. Alternatively, bath 320 may be configured to receive an etched foil sheet in a substantially continuous manner. For example, foil wound on a roller may be unrolled as a continuous foil sheet and passed through the electrochemical bath in a substantially continuous manner. The foil may then be rerolled downstream of bath 320 subsequent to the ECD process. As should be apparent, the unrolling and rolling of the foil sheet, and feeding of the foil sheet through the ECD bath, may be automated. For example, motors may be provided on rollers over which the foil sheet is wound. Additional motorized and/or free-wheeling rollers may be used to support the continuous foil sheet along its movement through bath 320. Commonly-owned U.S. application Ser. No. 10/745,016 to Stocker et al., incorporated by reference herein in its entirety, describes etching a foil sheet in a substantially continuous manner using a plurality of rollers (e.g., rollers 600a-f shown in FIG. 6 of that patent application). A similar configuration of rollers as described in U.S. application Ser. No. 10/745,016 may be employed for passing an etched foil sheet through bath 320 between cathodes 390 in a substantially continuous manner.

The phrase "substantially continuous" is used herein to mean the foil is passed through the electrochemical bath in a manner such that the foil is electrochemically drilled substantially uniformly along its length. For example, the substantially continuous manner includes, but is not limited to, passing the foil through the bath at a constant speed. The substantially continuous manner further includes passing the foil through the bath at an intermittent speed, which means the foil is passed through the electrochemical bath for a period of time and the foil is stopped or at rest for a period of time. The period of time for each cycle can vary, and the speeds at which the foil is passed through the bath may further be dependent on the dimension of the tank. For example, if it is desired to subject a portion of the foil in the ECD bath for 1.5 to 2.5 minutes with a given applied current (or other measure of the coulombs applied to the foil), the speed for passing the foil through in a continuous manner may be based on the length of the tank though which the foil passes. The cycle of passing and stopping may be repeated, in a continuous manner, until the desired amount of foil sheet has passed through the electrochemical bath for the desired total amount of time. Accordingly, passing the foil through the bath in a substantially continuous manner may expose the foil to the ECD bath for a similar length of time as the processing of individual foils in sequence.

Figure 4:
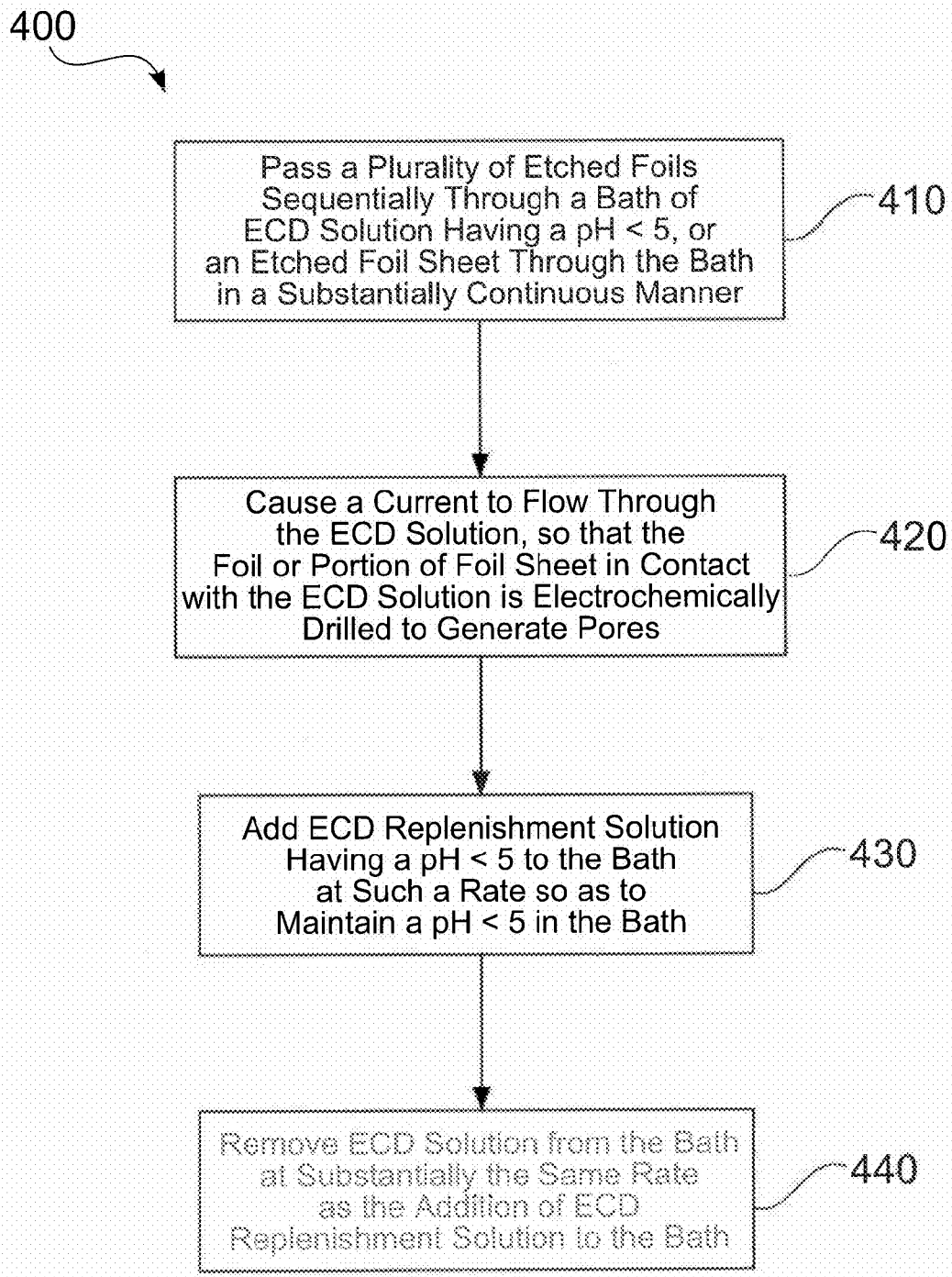
FIG. 4 is a flowchart of a method for creating porous anode foils according to an embodiment of the present application.
Figure 5:
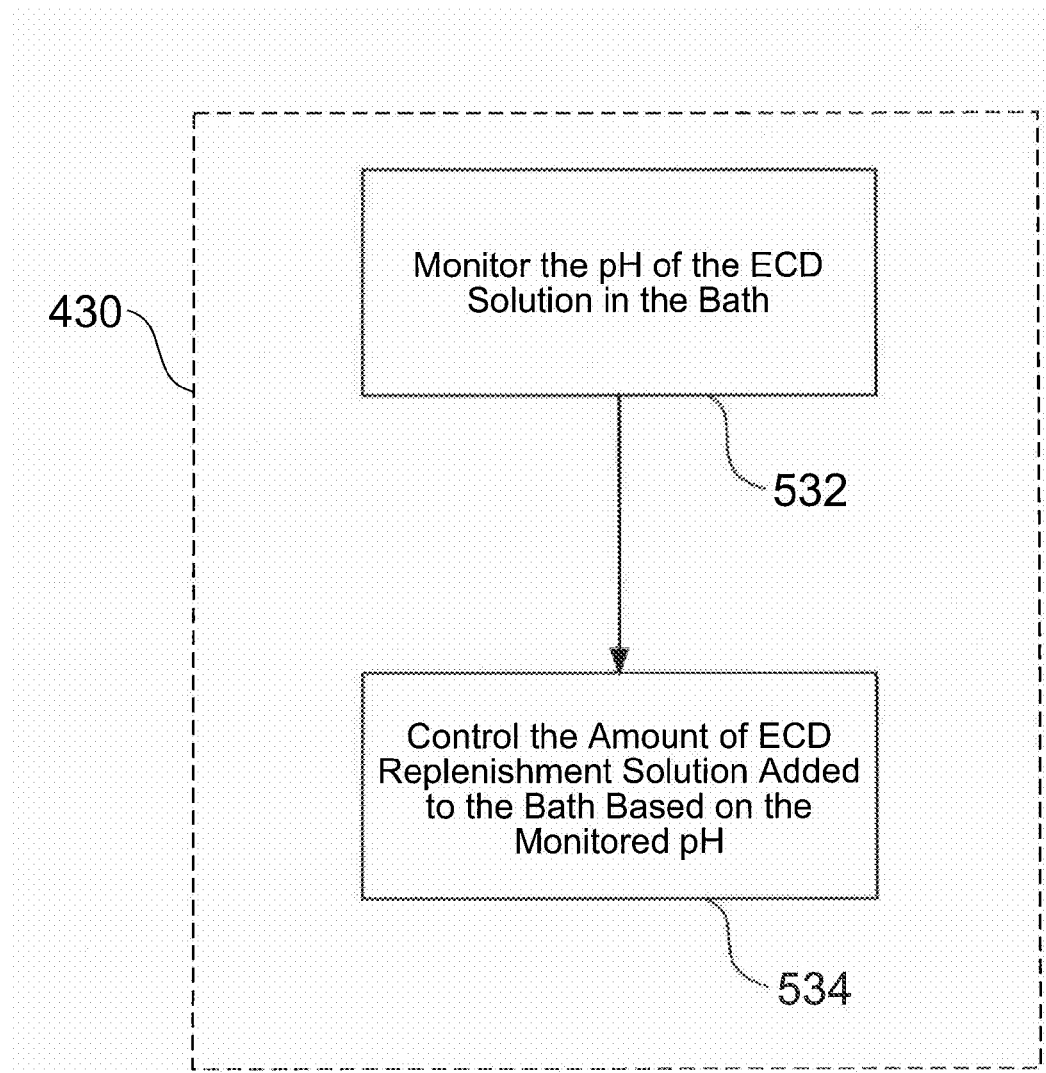
FIG. 5 is a flowchart of a method for maintaining a pH of an electrochemical drilling solution in accordance with the method of FIG. 4, according to an embodiment of the present application.

FIGS. 4 and 5 illustrate steps of a process 400 for creating porous anode foil, in accordance with the present application. As with system 300, process 400 may be employed to electrochemically drill a plurality of etched foils in sequence one after the other or drill a continuous etched foil sheet in a substantially continuous manner. Accordingly, in step 410 of process 400, either a plurality of etched foils are passed sequentially through a bath of ECD solution or an etched foil sheet is continuously passed through the bath. As noted above, the bath has a pH below about 5, so as to be sub-neutral, and at least slightly acidic. In step 420, a current flows through the solution and is thereby applied to the foil or portion thereof in contact with the ECD solution, whereby the foil or portion thereof is electrochemically drilled to generate pores. In step 430, ECD replenishment solution having a pH of less than about 5 is added in order to maintain the pH of the bath during foil processing. ECD solution in the bath is removed in step 440. To maintain the levels of bath and ensure steady state aluminum concentration, it is preferred that ECD solution is removed from the bath at substantially the same rate as the addition of the ECD replenishment solution to the bath.

In one embodiment, the pH of the solution in the bath is highly acidic, with a pH of equal to or less than about 3, and is maintained at this pH in accordance with process 400. The ECD replenishment solution may therefore have a pH of equal to or less than about 3 so as to maintain the bath within this pH range. The ECD replenishment solution and the ECD solution initially contained in the bath comprise about 0.1% by weight of an acid. As noted above, preferably, the acid is hydrochloric acid, and the ECD replenishment solution and the ECD solution initially contained in the bath include about 1000 PPM of a surface passivator and about 5% by weight sodium chloride. In this instance, to maintain the pH of equal to or less than about 3 in the bath, with two 252 cm$^2$ etched metal foils exposed to the bath at the same time and a total run time for the two foils of about two minutes, exemplary feed and bleed flow rates are about 250 g/min per 50 liters of ECD solution in the bath, with a total of thirty 252 cm$^2$ etched metal foils undergoing the electrochemical drilling step in about 30 minutes. The ECD replenishment solution and the solution bled from the bath may be continuously or intermittently added/bled in accordance with such flow rates. For example, in one embodiment, about 1250 g of ECD replenishment solution is added intermittently every 5 minutes, and in another embodiment, a batch of about 2500 g of ECD replenishment solution is added every 10 minutes. In another embodiment, every 30 minutes between about 1% to 5% of the total volume of ECD solution in the bath is bled and replenished with ECD replenishment solution.

Feeding and bleeding of ECD solution may be made automatic by implementing a control system to monitor the pH of the bath and control flow feed and bleed flow rates. FIG. 5 illustrates steps 532 and 534 for maintaining the pH in the bath by the addition of ECD replenishment solution, in accordance with step 430 of process 400. In step 532, the pH of the ECD solution in the bath is monitored, and in step 534, the amount of ECD replenishment solution added to the bath is controlled based on pH monitored in step 532. For example, as described above with reference to system 300 of FIG. 3, a pH meter may be used to measure the pH of ECD solution in bath 320, and its output may be used to open a solenoid valve to bleed ECD solution from the bath when the pH rises to a predetermined control limit (e.g., a pH of 3). Control settings will dictate the amount solution to bleed (and replenish) so that the desired pH is maintained.

Porous anode foil produced using an ECD process with a sub-neutral ECD solution, according to the methods described herein, when used in a multiple anode stack configuration, will exhibit the same or better foil capacitance and the same or reduced ESR compared to a substantially neutral ECD process using a neutral to basic ECD solution. The porous foil is suitable for commercial use in an electrolytic capacitor with a multiple anode stack or wound roll configuration. Thus, the present application is further directed to an electrolytic capacitor having porous anode foil provided by etch, ECD, and widening processes described herein.

Anode foils that are processed according to the methods described above can be utilized for a variety of applications that require a high capacitance anode foil. For example, as discussed above, anode foils are widely utilized in electrolytic capacitors, such as those described in U.S. Pat. Nos. 5,131,388 and 5,584,890, incorporated herein by reference. Electrolytic capacitors, which are manufactured with anode foils etched according to the present invention, can obtain a given capacity with a smaller volume than currently available electrolytic capacitors and, therefore, can be very compact in size.

Electrolytic capacitors manufactured with porous anode foils created in accordance with the methods described herein can be utilized in ICDs, such as those described in U.S. Pat. No. 5,522,851, incorporated by reference herein in its entirety, such that the increased capacitance per unit volume of the electrolytic capacitor allows for a reduction in the size of the ICD. Thus, the present application is further directed to an ICD utilizing an electrolytic capacitor having porous anode foil provided by the process described herein.

Having now generally described the invention, the same will be more readily understood through reference to the following examples which are provided by way of illustration, and are not intended to be limiting of the present invention.

3. EXAMPLES

The following Examples 1-3 show ECD process experiments in which using an "acid ECD solution" that includes 0.1% by weight of acid, as a replacement for a "neutral ECD solution" excluding such acid, gives the same or better foil capacitance, foil capacitance standard deviation, porosity, punch yield, and capacitor electrical requirements. In each of the examples, the acid ECD solution is 5% sodium chloride, 1000 ppm sodium nitrate, and varying hydrochloric acid. The neutral ECD solution is 5% sodium chloride and 500 ppm sodium nitrate. The results for the acid ECD foils from the experiments of Examples 1-3 are summarized below in Table 1. Exemplary process control limits described herein are applicable to both acidic and neutral ECD solutions.

Example 1

200 Etched Foils

Rolls of etched aluminum foils were used. After an ECD station was caustic cleaned using the caustic cleaning procedure, the stock neutral ECD solution was heated to 95° C. Once at 95° C., 25 grams of sodium nitrate to the solution was added to the ECD tank. Additionally, 370 grams of 5.0% HCl was added to the solution in the ECD tank, to make the stock solution in the tank an acid ECD solution. The pH was measured after running 2 sets of dummy foils. The pH was about 2.0. The ECD time was set at 1 minute and 24 seconds at 63.0 amps. Every 10 foils, 44 grams of the 5.0% HCl solution was added to the ECD solution. If the pH increased above 2.7, a second 44 grams of 5.0% HCl solution was added.

At the end of the 200 foils, 1672 grams of 5.0% HCl was added to the tank not counting the initial 370 g add. Therefore, the estimated HCl needed per foil was 0.42 g/foil. The filter was inspected for solid build up. The amount of solids on the filter was very minimal. The solution after 200 foils was slightly gray.

The second 200 foils were processed as normal using a neutral ECD solution, with no addition of HCl.

The average foil capacitance of the acidic ECD foil was 328.4 µF (per 252 cm$^2$) and the average foil capacitance of the normal ECD foil was 330.7 µF. The average foil capacitance was 1.30 µF/cm$^2$ (above a 1.22 µF/cm$^2$ test plan minimum). The standard deviation of the foil capacitance of the acidic ECD foil was 2.4%. The average ESR of 4 sheets of the acidic ECD foil tested at the beginning and after every 50 foils was 28.4 ohms and desirably below a 35 ohm upper process control limit. By keeping the ESR low, the charge efficiency and DSR (delivered to stored energy ratio) of the capacitor are maximized. In a finished capacitor, it is desirable to keep the DSR as close to 1 as possible. Therefore, a lower process control limit (e.g., 35 ohms) for ESR of each anode foil permits multiple stacked anodes to be used in a capacitor while maximizing DSR. Moreover, a multiple anode stack configuration permits reduction in the overall size of the implanted device.

The punch yield of the acidic ECD foil was 17.5 anodes out of 28 anodes, which is above a 16 anode minimum desired. Typically, a foil sheet may divided to produce 28 anodes. Punch yield refers to the quality of the foil, reflecting the number of useable anodes produced, with no defective anodes produced when the punch yield is 28 anodes, and the difference from 28 being the number of defective anodes (e.g., cracked foils).

Example 2

200 Etched Foils

After the ECD station was caustic cleaned using a caustic cleaning procedure, the stock neutral ECD solution was heated to 95° C. Once at 95° C., 25 grams of sodium nitrate was added to the ECD tank, Additionally, 1000 grams of 5.0% HCl was added to the solution in the ECD tank, to make the stock solution in the tank an acid ECD solution. The pH was measured after running 6 sets of dummy foils. The pH was about 0.56. The ECD time was set at 1 minute and 45 seconds at 50.4 amps. Every 10 foils, 44 grams of the 5.0% HCl solution was added to the ECD solution. If the pH increased above 2.7, a second 44 grams of 5.0% HCl solution was added. At the end of the 200 foils, 1518 grams of 5.0% HCl was added to the tank not counting the initial 1000 g add. Therefore, the estimated HCl needed per foil was 0.38 g/foil. The filter was inspected for solid build up. The amount of solids on the filter was very minimal. The solution after 200 foils was slightly gray.

The second 200 foils were processed as normal using the stock neutral ECD solution, with no addition of HCl.

The average foil capacitance of the acid ECD foil was 314.8 µF (per 252 cm$^2$) and the average foil capacitance of the normal ECD foil was 313.0 µF. The average foil capacitance was 1.25 µF/cm$^2$ and above the 1.22 µF/cm$^2$ test plan minimum. The standard deviation of the foil capacitance of the acid ECD foil was 2.6%. The average ESR of 4 sheets tested at the beginning and after every 50 foils was 28.2 ohms and desirably below a 35 ohm upper process control limit. The punch yield was 20.6 anodes out of 28 anodes, which is above a 16 anode minimum desired.

The foil drilled using the acidic ECD solution of Examples 1 and 2 were combined to make capacitors. The average delivered energy of the capacitors was 18.9 J with a DSR of 0.896. Therefore, the foil assembled into capacitors gave the appropriate delivered energy (above nominal of 18.75 J) and the DSR was high indicating high porosity.

Example 3

400 Etched Foils

The ECD station was not caustic cleaned using the caustic cleaning procedure before the experiment. Therefore, the experiment shows a worse case scenario of excess aluminum in the system.

Once at 95° C., 25 grams of sodium nitrate to the solution was added to the ECD tank. Additionally, 1000 grams of 5.0% HCl was added to the solution in the ECD tank. The pH was measured after running 6 sets of dummy foils. The pH was about 0.79.

The ECD time was set at 1 minute and 45 seconds at 50.4 amps.

Every 10 foils, 44 grams of the 5.0% HCl solution was added to the ECD solution. If the pH increases above 2.7, a second 44 grams of 5.0% HCl solution was added.

At the end of the 400 foils, 2904 grams of 5.0% HCl was added to the tank not counting the initial 1000 g add. Therefore, the estimated HCl needed per foil was 0.36 g/foil.

The filter was inspected for solid build up. The amount of solids on the filter was very minimal. The solution after 400 foils was slightly gray. The cathodes during the process did have some solid build up, but did not seem to be a problem and was easily removed.

The average foil capacitance of the acid ECD foil was 321.6 µF (per 252 cm$^2$). The average foil capacitance was 1.28 µF/cm$^2$ and above the 1.22 µF/cm$^2$ test plan minimum. The standard deviation of the foil capacitance of the acid ECD foil was 3.1% and below the 3.5% maximum. The average ESR of 8 sheets tested at random was 21.4 ohms and desirably below a 35 ohm upper process control limit. The punch yield was 17.2 anodes out of 28 anodes, which is above a 16 anode minimum desired.

The foil was used to make capacitors. The average delivered energy of the capacitors was 18.75 J with a DSR of 0.891. Therefore, the foil assembled into capacitors gave the appropriate delivered energy (above nominal of 18.75 J) and the DSR was high indicating high porosity.

TABLE 1

|  | # etched foils for Acid ECD | Foil Capacitance µF/cm$^2$ | Cap. std dev. | Average ESR Ω (per # sheets) | Punch Yield |
|---|---|---|---|---|---|
| Example 1 | 200 | 1.30 | 2.4% | 28.4 (4) | 17.5 |
| Example 2 | 200 | 1.25 | 2.6% | 28.2 (4) | 20.6 |
| Example 3 | 400 | 1.28 | 3.1% | 21.4 (8) | 17.2 |

Example 4

Twelve (12) foils were subjected to an ECD process to determine if porosity and capacitance met specification at an ECD solution pH between 0.5 and 1.0. The HCl concentration in the ECD solution was changed to add 6100 ml of 37% HCl per 700 liters of final ECD mix to maintain pH between 0.5 and 3.0. The ECD temperature specification was 85-95° C. with a target of 91° C.

Figure 6:
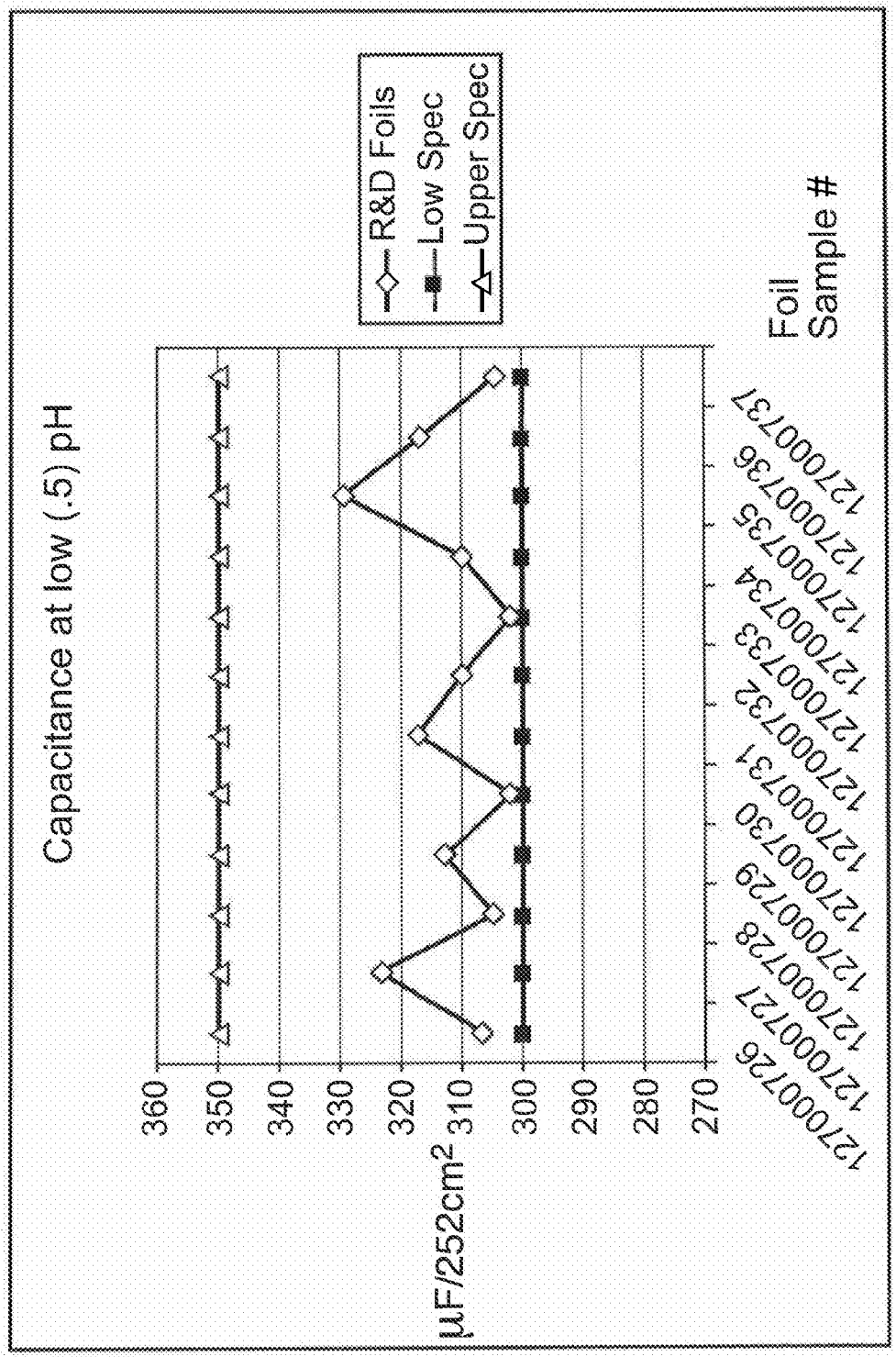
FIG. 6 is a graph of capacitance data from foils subject to an ECD process experiment of Example 4.
Figure 7:
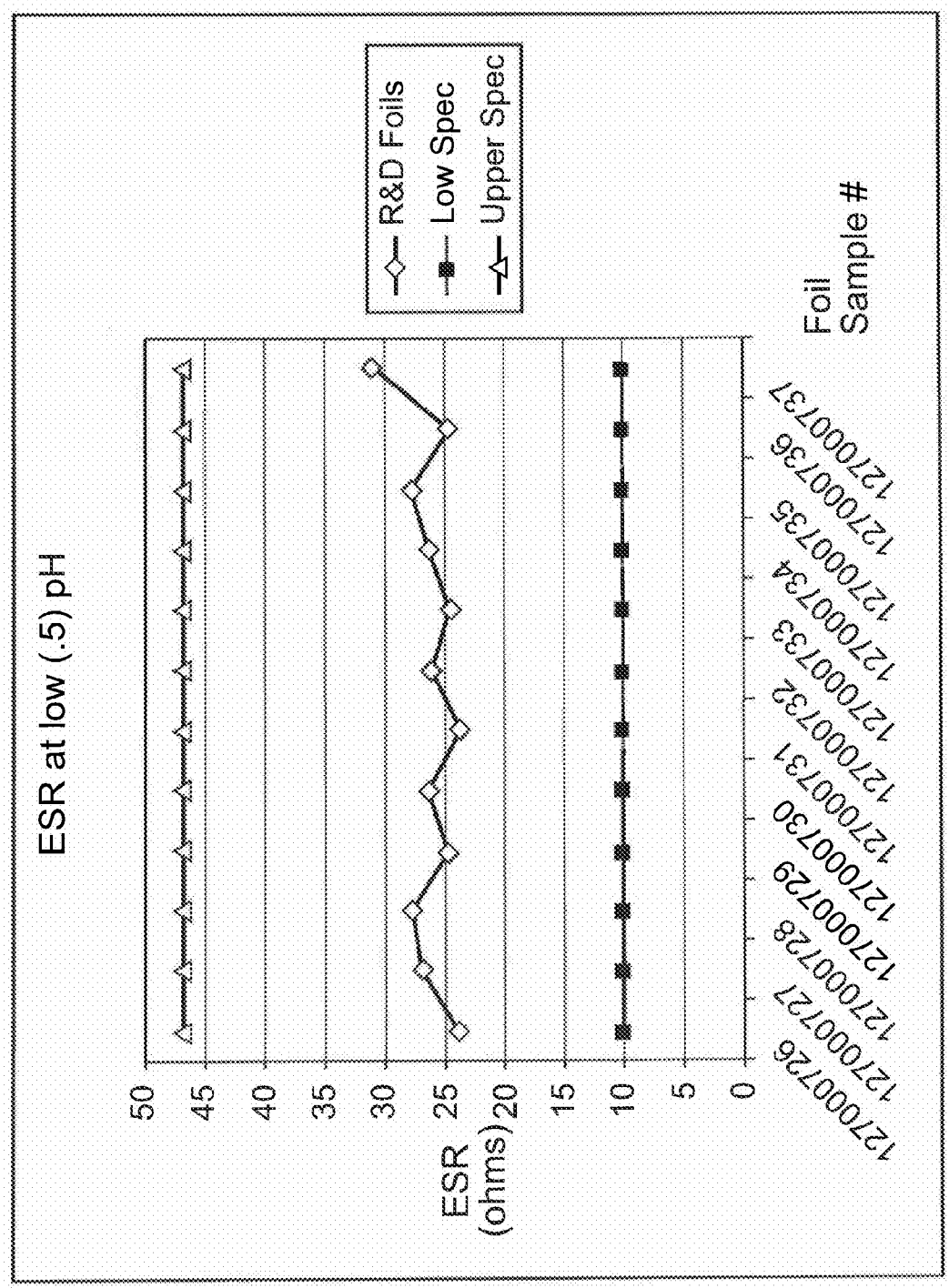
FIG. 7 is a graph of porosity data from foils subject to the ECD process experiment of Example 4.

The 12 foils processed at a pH between 0.5 and 1.0 met porosity and capacitance specification. The measured capacitance ($\mu F/252\ cm^2$) relative to upper and lower process control specifications is shown in FIG. 6, and the measured ESR ($\Omega$) relative to upper and lower process control specifications is provided in FIG. 7.

4. Conclusion

It is to be appreciated that the Detailed Description section, and not the Summary and Abstract sections, is intended to be used to interpret the claims. The Summary and Abstract sections may set forth one or more but not all exemplary embodiments of the present system and method as contemplated by the inventors, and thus, are not intended to limit the present method and system and the appended claims in any way.

Moreover, while various embodiments of the present system and method have been described above, it should be understood that they have been presented by way of example, and not limitation. It will be apparent to persons skilled in the relevant art(s) that various changes in form and detail can be made therein without departing from the spirit and scope of the present system and method. Thus, the present system and method should not be limited by any of the above described exemplary embodiments, but should be defined only in accordance with the following claims and their equivalents.

In addition, it should be understood that the figures, which highlight the functionality and advantages of the present system and method, are presented for example purposes only. Moreover, the steps indicated in the exemplary system(s) and method(s) described above may in some cases be performed in a different order than the order described, and some steps may be added, modified, or removed, without departing from the spirit and scope of the present system and method.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present system and method in any way.

What is claimed is:

1. A system for creating a porous anode foil, comprising:
    an electrochemical bath containing an electrochemical drilling (ECD) solution initially comprising 10 to 5000 PPM of a surface passivator, and about 0.1% by weight of an acid, wherein the ECD solution has a pH within a range of 0.5 to 3, the bath configured to receive an etched foil sheet in a substantially continuous manner such that a portion of said etched foil sheet is in contact with the ECD solution in the bath;
    a charge source connected to the bath to cause an electrochemical reaction in the bath;
    a feed reservoir fluidly connected to the electrochemical bath, the feed reservoir containing an ECD replenishment solution comprising 10 to 5000 PPM of the surface passivator, and about 0.1% by weight of the acid, wherein the ECD replenishment solution has a pH within a range of 0.5 to 3;
    a waste reservoir fluidly connected to the electrochemical bath for receiving ECD solution removed from the bath; and
    a pump for adding the ECD replenishment solution to the bath from the feed reservoir so as to maintain the pH of the ECD solution within a range of 0.5 to 3.

2. The system of claim 1, further comprising:
    a monitor for monitoring the pH of the ECD solution in the bath; and
    a controller for controlling the amount of ECD replenishment solution added to the bath by said pump based on the monitored pH provided by said monitor so as to maintain the pH of the ECD solution within a range of 0.5 to 3.

3. The system of claim 1, wherein the ECD replenishment solution and the ECD solution initially contained in the bath each comprises about 1000 PPM of the surface passivator.

4. The system of claim 3, wherein the ECD replenishment solution and the ECD solution initially contained in the bath each further comprises about 5% by weight sodium chloride.

5. The system of claim 4, wherein the acid is selected from the group consisting of hydrochloric acid, phosphoric acid, and nitric acid.

6. The system of claim 4, wherein the acid is hydrochloric acid.

7. The system of claim 4, wherein a temperature of the ECD solution in the bath is between about 80° C. and 90° C.

8. The system of claim 1, wherein the pump is further configured to add the ECD replenishment solution to the bath at rate of about 250 g/min per 50 liters of ECD solution in the bath.

9. The system of claim 1, further comprising a second pump coupled to the electrochemical bath and configured to mix the ECD solution within the bath.

10. The system of claim 1, further comprising a detector configured to detect a solution level of the ECD solution within the bath.

11. The system of claim 10, wherein the pump is further configured to be controlled based on an output from the detector.

* * * * *